(12) United States Patent
Kahn

(10) Patent No.: US 9,094,890 B2
(45) Date of Patent: *Jul. 28, 2015

(54) CALL MANAGEMENT PROTOCOL FOR INSUFFICIENT CREDIT

(71) Applicant: Starscriber Corporation, Mount Shasta, CA (US)

(72) Inventor: Ari Kahn, Johannesburg (ZA)

(73) Assignee: Starscriber Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,261

(22) Filed: Mar. 17, 2014

(65) Prior Publication Data

US 2014/0199960 A1    Jul. 17, 2014

Related U.S. Application Data

(63) Continuation of application No. 10/556,037, filed as application No. PCT/IB2004/001445 on May 7, 2004, now Pat. No. 8,675,841.

(30) Foreign Application Priority Data

May 8, 2003  (ZA) ........................................ 03/3551

(51) Int. Cl.
*H04M 11/00*     (2006.01)
*H04W 48/02*     (2009.01)
(Continued)

(52) U.S. Cl.
CPC .......... *H04W 48/02* (2013.01); *H04M 3/42042* (2013.01); *H04M 15/00* (2013.01); *H04M 15/06* (2013.01); *H04M 15/08* (2013.01); *H04M 15/47* (2013.01); *H04M 15/58* (2013.01); *H04M 15/88* (2013.01); *H04M 15/888* (2013.01); *H04M 17/00* (2013.01); *H04M 17/10* (2013.01); *H04M 17/20* (2013.01); *H04W 4/24* (2013.01); *H04M 2203/1008* (2013.01);
(Continued)

(58) Field of Classification Search
USPC ................................ 455/405–411, 567, 466; 379/114.01–114.29
See application file for complete search history.

(56) References Cited

U.S. PATENT DOCUMENTS 5,491,739 A      2/1996  Wadin et al.
5,740,229 A *    4/1998  Hanson et al. ............... 379/67.1
(Continued)

FOREIGN PATENT DOCUMENTS

DE      10106914     8/2002
EP      0802663      10/1997
(Continued)

*Primary Examiner* — Mehmood B Khan
(74) *Attorney, Agent, or Firm* — Baker Hostetler LLP

(57) ABSTRACT

A method and system for operating a telephony service are disclosed, in which callers with insufficient credit or network airtime are able to contact a call recipient. The network monitors call attempts from callers to identify call attempts from callers with insufficient credit or airtime to make a call. When such a call attempt is detected, a call request is transmitted to the intended recipient of the call, to notify the recipient of the call attempt. The notification may take the form of an in-call notification if the call recipient is on-line, or an SMS or voicemail message if the recipient is off-line. The method and system permit individuals who otherwise would not be able to access the network to indicate to a call recipient that they have attempted to contact the call recipient. The call recipient can then contact the would be caller at his/her discretion.

15 Claims, 1 Drawing Sheet

(51) Int. Cl.
  *H04M 3/42* (2006.01)
  *H04M 15/00* (2006.01)
  *H04M 15/06* (2006.01)
  *H04M 15/08* (2006.01)
  *H04M 17/00* (2006.01)
  *H04W 4/24* (2009.01)

(52) U.S. Cl.
  CPC ............... *H04M 2203/651* (2013.01); *H04M 2215/0116* (2013.01); *H04M 2215/0148* (2013.01); *H04M 2215/0188* (2013.01); *H04M 2215/2026* (2013.01); *H04M 2215/32* (2013.01); *H04M 2215/62* (2013.01)

(56) References Cited

U.S. PATENT DOCUMENTS

| | | | |
|---|---|---|---|
| 5,749,052 A | 5/1998 | Hidem et al. | |
| 5,859,900 A | 1/1999 | Bauer et al. | |
| 5,864,606 A * | 1/1999 | Hanson et al. | 379/88.18 |
| 6,137,872 A | 10/2000 | Davitt et al. | |
| 6,285,749 B1 | 9/2001 | Manto | |
| 6,463,139 B1 * | 10/2002 | Davitt et al. | 379/144.01 |
| 6,501,837 B1 | 12/2002 | Adler et al. | |
| 6,728,349 B2 * | 4/2004 | Chang et al. | 379/93.23 |
| 7,005,963 B1 * | 2/2006 | Scalisi et al. | 340/7.1 |
| 2001/0009849 A1 | 7/2001 | Hanson | |
| 2002/0061092 A1 | 5/2002 | Maropis et al. | |
| 2003/0198324 A1 | 10/2003 | Chang et al. | |
| 2004/0029561 A1 * | 2/2004 | Holter et al. | 455/405 |
| 2004/0058667 A1 * | 3/2004 | Pienmaki et al. | 455/405 |
| 2004/0132449 A1 * | 7/2004 | Kowarsch | 455/432.1 |
| 2004/0192359 A1 * | 9/2004 | McRaild et al. | 455/466 |
| 2006/0245575 A1 * | 11/2006 | Dammrose | 379/229 |
| 2008/0096525 A1 * | 4/2008 | Engelhart | 455/408 |
| 2010/0210264 A1 * | 8/2010 | Netanel et al. | 455/435.1 |

FOREIGN PATENT DOCUMENTS

| | | |
|---|---|---|
| EP | 1180895 | 2/2002 |
| EP | 1271911 | 1/2003 |
| GB | 2367218 | 3/2002 |
| GB | 2369270 | 5/2002 |
| GB | 2369971 | 6/2002 |
| WO | WO 98/34393 | 8/1998 |
| WO | WO 99/16265 | 4/1999 |
| WO | WO 00/38403 | 6/2000 |
| WO | WO 01/28220 | 4/2001 |
| WO | WO 01/63896 | 8/2001 |
| WO | WO 01/63897 | 8/2001 |
| WO | WO 01/95655 | 12/2001 |
| WO | WO 02/25923 | 3/2002 |
| WO | WO 2004/100521 | 11/2004 |

* cited by examiner

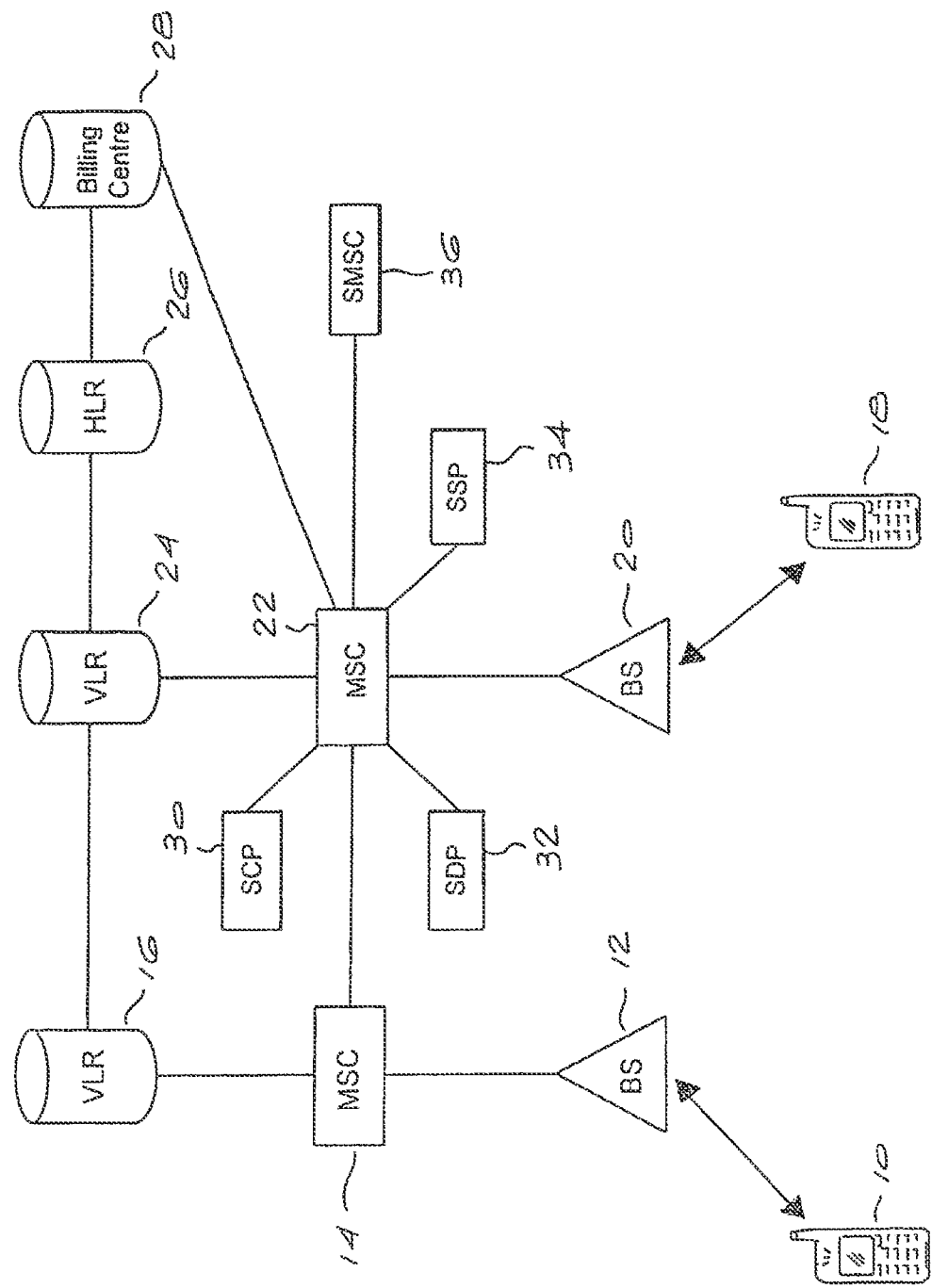

US 9,094,890 B2

CALL MANAGEMENT PROTOCOL FOR INSUFFICIENT CREDIT

CROSS-REFERENCE TO RELATED APPLICATIONS

This application is a continuation of, and claims priority to, U.S. patent application Ser. No. 10/556,037, filed Feb. 13, 2008, which is the National Stage of International Application No. PCT/IB2004/001445, filed May 7, 2004, which claims priority to South African Application No. 2003/3551, filed May 8, 2003, the disclosure of which is incorporated herein by reference in its entirety.

BACKGROUND

This invention relates to a method and system for operating a telephony service, and in particular to a call management protocol on a telephony network.

A substantial number of users of modern telephone networks make use of prepayment mechanisms to pay for their calls on a network. For example, users of a conventional fixed-line telephone network who use public telephones will typically use prepayment cards which store a credit value which is reduced according to the cost of calls made. Users of mobile networks who make use of prepaid airtime typically purchase an airtime recharge voucher which has a unique code. The user contacts the network and enters the code, and the balance of the user's prepaid airtime is increased accordingly. As the user makes calls, the balance is reduced accordingly.

In either case, once the credit value or prepaid airtime is exhausted, the user is prevented from making further use of the network and in particular making telephone calls until a new prepayment card is obtained (or the existing card is replenished with a further credit value) or further prepaid airtime is "loaded" on the network.

With the advent of modern telephone networks and, more recently, cellular networks with enhanced functionality, it is now possible to modify existing network call management protocols to deal with calls from callers having no airtime or insufficient airtime to make a call.

SUMMARY

According to the invention there is provided a method of operating a telephony service, the method comprising:
monitoring call attempts from callers on the network to identify call attempts originating from callers who have insufficient credit or airtime to make a call to an intended recipient; and
transmitting a call request to the intended recipient of the call such that the recipient's handset notifies the recipient of such a call attempt, without necessarily establishing a conventional call.

Typically, the caller is a prepaid caller on the network who has insufficient credit or airtime remaining on the prepayment mechanism that is being used to make the call.

The prepayment mechanism may be a prepaid telephone card or prepaid network airtime, for example.

Alternatively, the caller may be a subscriber to the network who has insufficient credit with the network operator to make the call.

Preferably, the method includes generating a notification to at least the call recipient that the call request is originating from a subscriber who has insufficient credit to make the call.

Preferably the method includes generating a notification to the caller that they have insufficient credit or airtime to place the call and that a call request has been submitted to the call recipient.

The call request may be presented to the call recipient as an in-call notification, typically if the call recipient is on-line.

Alternatively, the call request may be presented to the call recipient as a message such as an SMS message and/or a voicemail message, typically if the call recipient is off-line.

Further according to the invention there is provided a system for operating a telephony service, the system comprising:
a telephony network with a plurality of users; and
a network node having call screening logic arranged to:
i) monitor call attempts from users who have insufficient credit to make a call to the intended recipient; and
ii) transmit a call request to the intended recipient of the call such that the recipient's handset notifies the recipient of such a call attempt, without necessarily establishing a conventional call.

The system may include a database containing details of the credit/airtime status of network subscribers, the network being arranged to establish the credit/airtime status of a caller automatically and to generate the call request if the credit/airtime available to the caller is insufficient to make a call.

BRIEF DESCRIPTION OF THE DRAWING

The single drawing is a simplified diagrammatic illustration of a call management system according to the invention.

DETAILED DESCRIPTION OF ILLUSTRATIVE EMBODIMENT

The drawing shows, in a highly simplified schematic form, the architecture of a part of a modern GSM mobile telephone network. The diagram does not purport to be comprehensive but merely illustrative. The network will typically embody intelligent network (IN) functionality, but this is not essential for implementation of the invention.

In the illustrated network, a mobile telephone 10 of a caller communicates with a first base station 12 which in turn communicates with a mobile switching center (MSC) 14. The base station 12 comprises a base station controller (BSC) and a base transceiver station (BTS) with associated antenna (not shown). Associated with the mobile switching center 14 is a visited location register (VLR) 16.

A call recipient has a mobile telephone 18 which communicates with a second base station 20. The base station 20 is connected to a further mobile switching center (MSC) 22 with its own associated visited location register 24. (In some cases, the two base stations could be connected to the same MSC.) The respective mobile switching centers 14 and 22 and the respective visited location registers 16 and 24 are interconnected as shown. The visited location registers are also connected to a home location register (HLR) 26 and to a billing center 28. The MSCs 14 and 22 are also connected to the billing center. The HLR is a central database containing data relating to the account status and predetermined network settings of subscribers. The VLRs are decentralized databases which are updated with data from the HLR relating to a particular subscriber when that subscriber's telephone connects to the MSC in question.

Connected to the MSC 14 are a service control point (SCP) 30, a service data point (SDP) 32 and a service switching point (SSP) 34.

The SCP of the MSC 22 servicing the call recipient has terminating screening logic which is invoked when calls are set to route to the call recipient. The SDP is a database associated with the SCP containing data associated with the call recipient and in the context of this invention defining one or more groups of callers and their respective phone numbers.

The SSP is an optional intelligent network component forming part of a switching subsystem which essentially defines a network layer associated with switching services.

If the caller using the mobile telephone 10 has exhausted his/her prepaid airtime (or, in the case of a person using prepayment telephone cards, the user has depleted the credit value on the prepayment card) or does not have credit with the network operator, he/she will not be able to make calls normally. At best, emergency calls to certain predetermined numbers may be permitted by mobile networks, or calls to an operator may be permitted on a conventional network. The present invention proposes utilising the enhanced functionality of modern networks to monitor calls made on the network in order to identify call attempts made by callers with no or insufficient credit/airtime.

In the present example, when the caller utilising the telephone 10 attempts to make a call to the call recipient 18, the mobile switching center (MSC) 14 accesses the visited location register (VLR) 16 (and, if required, the billing center 28) and establishes that the caller does not have sufficient credit/airtime to make a call. Instead of routing a conventional call setup request via the MSC 22 to the telephone 18 of the call recipient, in the simplest form of the invention, the call request can be presented to the call recipient as a single ring ("ring once and disconnect") when the call recipient is online and available to the network. This is sufficient to generate a missed call message on the mobile telephone 18 of the call recipient, alerting him/her to the fact that the caller wishes to make contact. The call recipient can then return the call at his/her discretion.

Preferably, if the call recipient's mobile telephone is online, a prerecorded in-call message is presented to the call recipient, indicating that a call request from a caller without credit/airtime has been received. In the case of the call recipient using a conventional telephone on a fixed-line network, a distinctive ringing tone can be presented.

Preferably, if the call recipient's mobile telephone is offline or out of coverage, the network submits a notification which is stored and forwarded to the mobile telephone when it becomes available. Here the MSC 22 automatically transmits a signal to a short message service center (SMSC) 36, instructing the SMSC to transmit an SMS message to the call recipient in a predetermined format, requesting the call recipient to contact the caller. Preferably, the SMS message contains the caller's telephone number, extracted by caller line identification (CLI) and can take the following format, for example:

084 4432100 Please ring me

Optionally, the message can include an indication that the caller has no credit or airtime, for example:

084 4432100 Please ring me—no airtime

Alternatively, or in addition, a prerecorded voicemail message can be deposited in the voice mailbox of the call recipient, with a conventional notification being sent to the call recipient to alert them to the existence of the SMS and/or voicemail messages. The voicemail message could be entirely computer synthesized, including the caller's telephone number, or could include a recording of the caller's name, recorded previously, in a message requesting the call recipient to respond to the caller's message.

Compared with alternative proposals for transmitting messages to call recipients, a significant feature of the present invention is that it is not necessary for the caller to construct, address and send an SMS message from their own handset, or to prefix the telephone number of the call recipient with a special code in order to send a message to the call recipient. Instead, the network itself establishes that the caller does not have credit/airtime and automatically transmits a call request and/or message to the call recipient, requesting the call recipient to contact the caller. The very one and same telephone number is dialed and the network now takes the most appropriate and intelligent action.

It will be appreciated that variations of the above described example are possible. For example, a more personalized service could be provided in which the network actually establishes a call to the call recipient and, on answering of the call by the call recipient, plays a prerecorded announcement requesting the call recipient to call the caller back, for example by pressing a predetermined button on the telephone. In this way, the caller and the call recipient could be connected reverse charged (the called party assuming the cost of the call) without having to re-establish the call routing and call path, since the caller may be kept actively engaged on the call all the while.

The described method and system have a number of advantages. Firstly, a caller is able to make contact with a selected call recipient even if the caller is out of credit/airtime on the network. This can include an implicit or explicit request for the call recipient to return the call.

It is envisaged that the described method and system will increase revenue from subscribers making use of the service, as callers such as children who have insufficient prepaid airtime to make a conventional call are able nevertheless to request a parent or family member to call them back, at the parent or family member's expense. Currently, using existing telephone network operating protocols, such a caller would not be able to establish a call to the person in question.

A further benefit is that the method and system operate by detecting callers with no or insufficient credit/airtime and allowing them to send call requests via the network, but callers with adequate airtime who simply choose to send a message requesting a call recipient to call them back need not be accommodated.

What is claimed:

1. A method of operating a telephony service, the method comprising:
    detecting, at a first mobile switching center, an attempt by a calling device to place a voice call to a recipient device;
    querying, by the first mobile switching center, a platform to determine whether a pre-determined amount of credit exists in an account associated with the calling device to establish the voice call;
    receiving, at the first mobile switching center, an indication that the account associated with the calling device has less than the pre-determined amount of credit to establish the voice call; and
    responsive to detecting the attempt by the calling device to place the voice call to the recipient device and receiving the indication that the account associated with the calling device has less than the pre-determined amount of credit to establish the voice call:
    transmitting a command to a first device that causes the first device to generate a message for transmission to the recipient device via a second mobile switching center servicing the recipient device without transmitting a call setup request to the second mobile switching center,
    wherein the message comprises a request to place a call to the calling device; and
    wherein the account is identified as a prepaid subscriber account that has less than the pre-determined amount of credit or airtime remaining on a prepayment mechanism that is being used to make the voice call.

2. A method according to claim 1 wherein the prepayment mechanism is a prepaid telephone card or prepaid network airtime.

3. A method according to claim 1 wherein the account is identified as a subscriber account that has less than the pre-determined amount of credit with a network operator to make the voice call.

4. A method according to claim 1 wherein the command comprises content for the message, wherein the content comprises an indication that the calling device is associated with an insufficient credit account.

5. A method according to claim 1 further comprising transmitting a notification to the calling device indicating that the account associated with the calling device has less than the pre-determined amount of credit to connect the voice call and that the message has been transmitted to the recipient device.

6. A method according to claim 1 wherein the message comprises an in-call voice notification, and wherein the command causes the first device to generate the in-call voice notification.

7. A method according to claim 1 wherein the message comprises a voicemail message, and wherein the command causes the first device to generate the voicemail message.

8. A mobile switching center comprising a processor configured to:
    detect an attempt by a calling device to place a voice call to a recipient device;
    query a platform to determine whether a pre-determined amount of credit exists in an account associated with the calling device to establish the voice call;
    receive an indication that the account associated with the calling device has less than the pre-determined amount of credit to establish the voice call; and
    responsive to the detection of the attempt by the calling device to place the voice call to the recipient device and receiving the indication that the account associated with the calling device has less than a pre-determined amount of credit to establish the voice call:
    transmit an instruction to a first device that causes the first device to generate a message for transmission to the recipient device via a second mobile switching center servicing the recipient device without transmitting a call setup request to the second mobile switching center,
    wherein the message comprises a request to place a call to the calling device; and
    wherein the platform comprises a database comprising details of credit or airtime status of network subscribers
    wherein the account is identified as a prepaid subscriber account that has less than the pre-determined amount of credit or airtime remaining on the prepayment mechanism that is being used to make the voice call.

9. A mobile switching center according to claim 8 wherein the command comprises content for the message, wherein the content comprises an indication that the calling device is associated with an insufficient credit account.

10. A mobile switching center according to claim 8 wherein the processor is further configured to transmit a notification to the calling device indicating that the account associated with the calling device has less than the pre-determined amount of credit to connect the voice call and that the message has been transmitted to the recipient device.

11. A mobile switching center according to claim 8 wherein the message is an in-call voice notification, and wherein the command causes the first device to generate the in-call voice notification.

12. A mobile switching center according to claim 8 wherein the message comprises a voicemail message, and wherein the command causes the first device to generate the voicemail message.

13. A mobile switching center according to claim 8, wherein the processor configured to query a platform comprises the processor configured to access a visited location register to determine if the pre-determined amount of credit exists in the account associated with the calling device to establish the voice call.

14. The method of claim 1 wherein querying the platform comprises accessing a visited location register to determine if the pre-determined amount of credit exists in the account associated with the calling device to establish the voice call.

15. The method of claim 14, wherein accessing the visited location register further comprises accessing a billing center.

* * * * *